(12) United States Patent
Diouf

(10) Patent No.: US 7,636,354 B2
(45) Date of Patent: Dec. 22, 2009

(54) DERIVING PASSIVE OPTICAL NETWORK PORT IDENTIFIERS

(75) Inventor: Leopold Diouf, Raleigh, NC (US)

(73) Assignee: Alcatel Lucent, Paris (FR)

( * ) Notice: Subject to any disclaimer, the term of this patent is extended or adjusted under 35 U.S.C. 154(b) by 532 days.

(21) Appl. No.: 11/231,186

(22) Filed: Sep. 20, 2005

(65) Prior Publication Data

US 2006/0126627 A1 Jun. 15, 2006

Related U.S. Application Data

(60) Provisional application No. 60/634,866, filed on Dec. 11, 2004.

(51) Int. Cl.
*H04L 12/26* (2006.01)
*H04J 3/26* (2006.01)

(52) U.S. Cl. .................................. 370/390; 370/432

(58) Field of Classification Search .................. 370/432, 370/390
See application file for complete search history.

(56) References Cited

U.S. PATENT DOCUMENTS 5,566,170 A * 10/1996 Bakke et al. ................. 370/392
6,065,061 A    5/2000 Blahut et al.
2004/0028409 A1 2/2004 Kim et al.
2004/0057462 A1 3/2004 Lim et al.
2004/0196862 A1 10/2004 Song et al.

OTHER PUBLICATIONS

Newton's Telecom Dictionary, 13 th Edition, 1998. http://www.trynci.com/cat/ref5.htm.*
ITU-T: Telecommunication Standardization Sector of ITU; G.984.4 (Jun. 2004); Series G: Transmission Systems and Media, Digital Systems and Networks; Chapter 6.5; pp. 1-13.
ITU-T: Telecommunication Standardization Sector of ITU; G.984.3 (Feb. 2004); Series G: Transmission Systems and Media, Digital Systems and Networks; Chapters 3.16, 9.2.3.14; pp. 1-107.

* cited by examiner

*Primary Examiner*—Seema S. Rao
*Assistant Examiner*—Wanda Z Russell
(74) *Attorney, Agent, or Firm*—Galasso & Associates

(57) ABSTRACT

A method in accordance with the present invention comprises identifying a M-bit multicast address and deriving a N-bit PON port identifier from the M-bit multicast address. Identifying the M-bit multicast address and deriving the N-bit PON port identifier are performed at an Optical Line Terminal (OLT) of a Passive Optical Network (PON). The N-bit PON port identifier has fewer bits than the M-bit multicast address. Deriving the N-bit PON port identifier includes mapping N−1 Least Significant Bits (LSB) of the M-bit multicast address to N−1 LSB of the N-bit PON port identifier and setting a 1 Most Significant Bit (MSB) of the N-bit PON port identifier to a bit setting that designates the N-bit PON port identifier as being a multicast port identifier.

20 Claims, 4 Drawing Sheets

DERIVING PASSIVE OPTICAL NETWORK PORT IDENTIFIERS

CROSS REFERENCE TO RELATED APPLICATIONS

This patent application claims priority to co-pending U.S. Provisional Patent application having Ser. No. 60/634,866 filed Dec. 11, 2004 entitled "Deriving PON Multicast Port or PON Multicast VP from IP or MAC Multicast Address", having a common applicant herewith and being incorporated herein in its entirety by reference.

FIELD OF THE DISCLOSURE

The disclosures made herein relate generally to Passive Optical Networks and, more particularly, to determining ports in Passive Optical Networks.

BACKGROUND

Support of Internet Protocol (IP) video poses numerous challenges on a Passive Optical Network (PON). One consideration from which such challenges arise is that IP video service is relatively high-demand in terms of bandwidth, thus leading to potential bandwidth allocation issues. Another consideration from which such challenges arise is that there are relatively frequent demands from video operators to support a greater number of IP video channels (e.g., IP television channels), which lead to relatively frequent changes in channel programming. Still another consideration from which such challenges arise is that the need exists for simultaneous support of multiple channels. Yet another consideration from which such challenges arise is that multiple set-top-boxes (STBs) in a subscriber premise are often tuned to the same channel.

Given the broadcast nature of PON signal transmissions, provision must be in place to minimize channel duplication on the PON. Bandwidth allocation for such channel duplication, as well as for the number of available channels, can adversely affect PON performance. To enhance bandwidth utilization in a PON providing IP video services, it is preferred to avoid broadcasting more than one copy of a particular channel regardless of how many viewers are actually watching that particular channel.

Therefore, a solution that addresses challenges associated with support of IP video on a PON would be useful and advantageous.

SUMMARY OF THE DISCLOSURE

Embodiments of the present invention address challenges associated with support of Internet Protocol (IP) video on a PON. More specifically, by automatically deriving a PON port identifier from a multicast address, embodiments of the present invention support multicast PON addresses (e.g., port-ids and Virtual Port Identifiers) in a manner that provides for efficient IP video on the PON and efficient bandwidth usage on the PON. In doing so, methods and equipment in accordance with the present invention address challenges associated with IP video service being relatively high-demand in terms of bandwidth, with demands from video operators to support a greater number of IP video channels, with the need for simultaneous support of multiple channels and with multiple set-top-boxes (STBs) in a subscriber premise being tuned to the same channel. Accordingly, the present invention advantageously enhances PON versatility and IP video appeal.

In one embodiment of the present invention, a method comprises identifying a M-bit multicast address and deriving a N-bit PON port identifier from the M-bit multicast address. The N-bit PON port identifier has fewer bits than the M-bit multicast address. Deriving the N-bit PON port identifier includes mapping N−1 Least Significant Bits (LSB) of the M-bit multicast address to N−1 LSB of the N-bit PON port identifier and setting a 1 Most Significant Bit (MSB) of the N-bit PON port identifier to a bit setting that designates the N-bit PON port identifier as being a multicast port identifier.

In another embodiment of the present invention, a method comprises identifying a 32-bit IP multicast address or a 48-bit MAC multicast address and deriving a 12-bit PON port identifier from the 32-bit IP multicast address or from the 48-bit MAC multicast address, respectively. Deriving the 12-bit PON port identifier includes mapping 11 LSB of the 32-bit IP multicast address to 11 LSB of the 12-bit PON port identifier or mapping the mapping 11 LSB of the 48-bit MAC multicast address to the 11 LSB of the 12-bit PON port identifier and includes setting a 1 MSB of the 12-bit PON port identifier to a bit setting that designates the 12-bit PON port identifier as being a multicast port identifier.

In another embodiment of the present invention, a network element comprises one or more data processing devices, memory connected to the one or more data processing devices and instructions accessible from the memory and processable by the one or more data processing device. The instructions are configured for enabling the one or more data processing device to facilitate identifying a M-bit multicast address and deriving a N-bit PON port identifier from the M-bit multicast address. The N-bit PON port identifier has fewer bits than the M-bit multicast address. Deriving the N-bit PON port identifier includes mapping N−1 LSB of the M-bit multicast address to N−1 LSB of the N-bit PON port identifier and setting a 1 MSB of the N-bit PON port identifier to a bit setting that designates the N-bit PON port identifier as being a multicast port identifier.

Turning now to specific aspects of the present invention, in at least one embodiment, the M-bit multicast address is an IP multicast address.

In at least one embodiment of the present invention, the M-bit multicast address is a MAC multicast address.

In at least one embodiment of the present invention, the bit setting is a bit setting of 1.

In at least one embodiment of the present invention, identifying and deriving are performed at a network element of a PON.

In at least one embodiment of the present invention, the network element is an Optical Line Terminal (OLT), an Optical Network Termination (ONT) or an Optical Network Unit (ONU).

In at least one embodiment of the present invention, deriving the PON port identifier is performed automatically by a network element of a PON without human intervention in response to identifying the multicast address.

These and other objects, embodiments advantages and/or distinctions of the present invention will become readily apparent upon further review of the following specification, associated drawings and appended claims.

DETAILED DESCRIPTION OF THE DRAWING FIGURES

Figure 1:
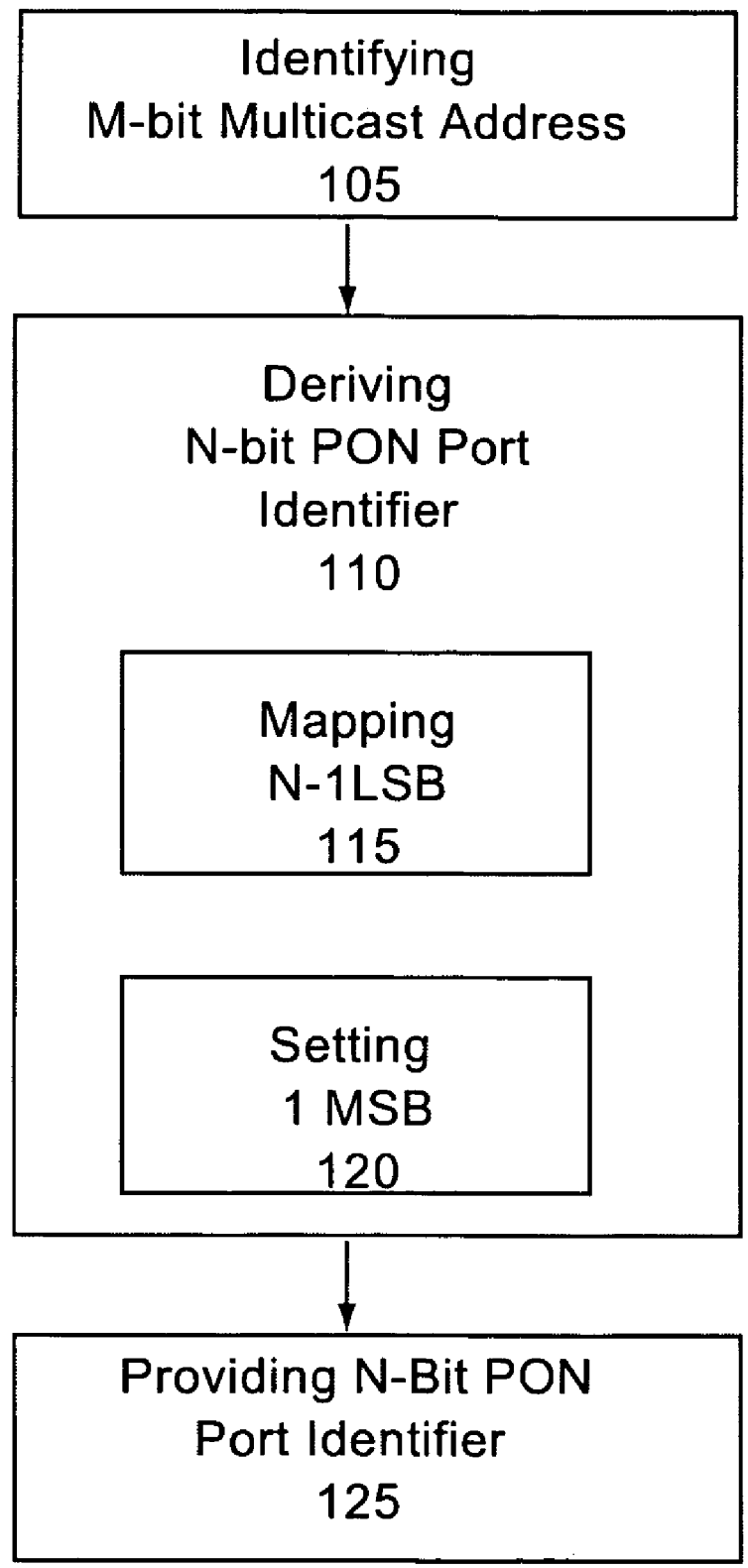
FIG. 1 depicts an embodiment of a method in accordance with the present invention.

FIG. 1 depicts an embodiment of a method in accordance with the present invention, which is referred to herein as the method 100. The method 100 is configured for deriving a Passive Optical Network (PON) multicast port identifier from a multicast address. In this manner, the present invention enables the Optical Line Terminal (OLT) and Optical Network Termination (ONT) or Optical Network Unit (ONU) to individually and automatically derive a PON port or a PON Virtual Port (VP) between the OLT and ONT from the multicast address without provisioning. Through the use of such a method in accordance with the present invention, the present invention enables a single copy of a particular content (e.g., a particular television channel) to be provided on the PON regardless of how many subscribers are actually watching that particular channel, enhances the efficiency in which IP video on the PON is able to be provided and increases bandwidth usage efficiency on the PON.

For simplicity and clarity, the terms ONT and ONU shall both be referred to hereinafter as an Optical Network Termination Unit (ONTU). As is well known, an ONT and an ONU are similar devices that provide similar functionality. These devices provide interface functionality between the Customer Premise Equipment (CPE) and an OLT that serves that CPE. The primary distinction between an ONT and an ONU is their intended physical location and preferred application.

As depicted in FIG. 1, the method includes an operation 105 that is performed for identifying a M-bit multicast address. Examples of the M-bit multicast address include, but are not limited to, a 32-bit Internet Protocol (IP) multicast address and a 48-bit Media Access Control (MAC) multicast address. In response to identifying the M-bit multicast address, an operation 110 is performed for deriving a N-bit PON port identifier from the M-bit multicast address. The N-bit PON port identifier may represent a PON port or PON multicast VP. A 12-bit PON port identifier is an example of the N-bit PON port identifier. Thus, in accordance with the present invention, the N-bit PON port identifier has fewer bits than the M-bit multicast address.

Deriving the N-bit PON port identifier includes mapping at least two tasks. A first task 115 is performed for mapping N−1 Least Significant Bits (LSB) of the M-bit multicast address to N−1 LSB of the N-bit PON port identifier. A second task 120 is performed for setting a 1 Most Significant Bit (MSB) of the N-bit PON port identifier to a bit setting that designates the N-bit PON port identifier as being a multicast port identifier. It is disclosed herein that the first task 115 and the second task 120 may be performed sequentially or in parallel. An operation 125 is then performed for providing the N-bit PON port identifier to a logic element of the PON, a hardware element of the PON and/or a human element of the PON such that the N-bit PON port identifier may be utilized for facilitating transmission of information (e.g., video signal information) via the PON.

Figure 2:
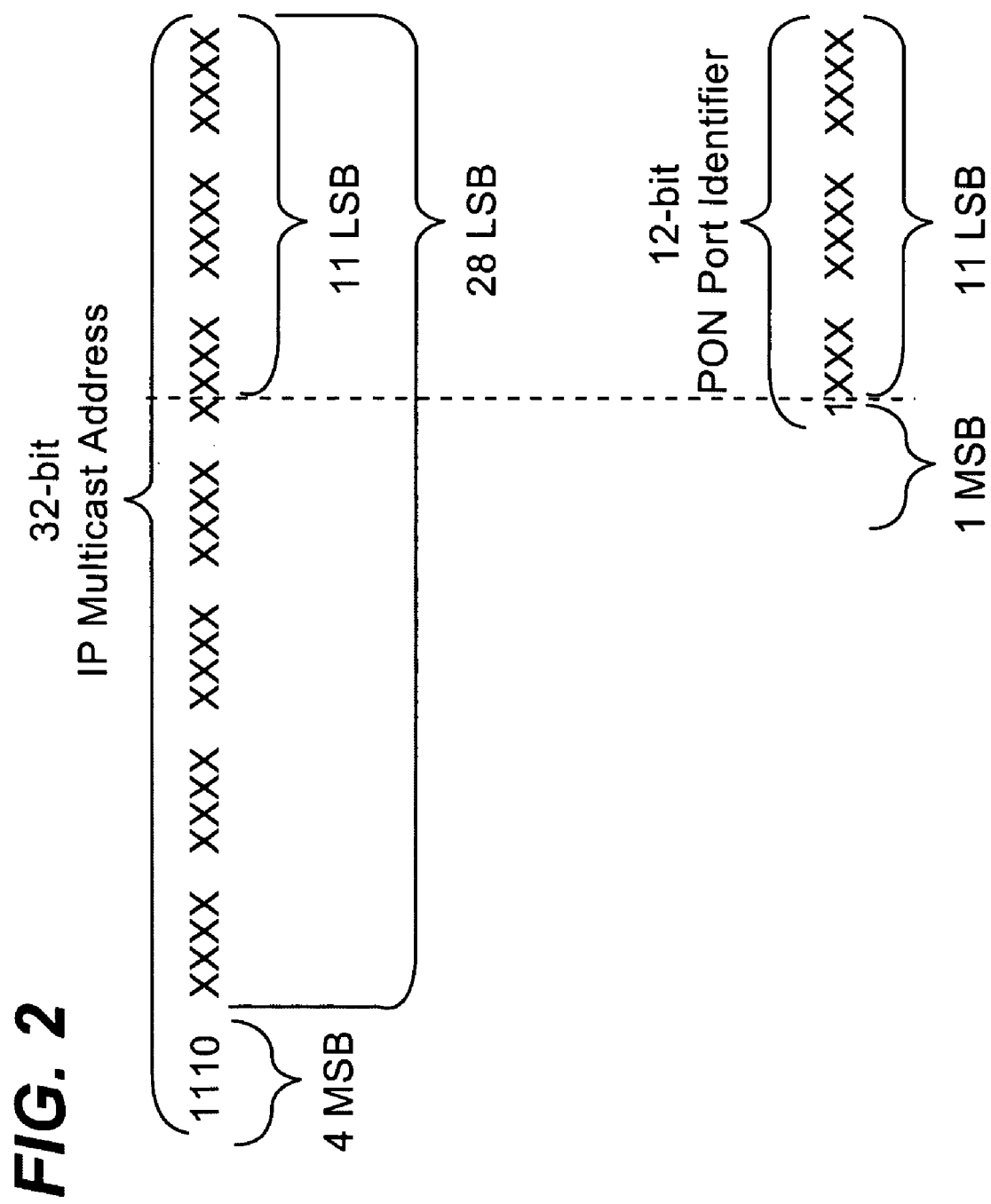
FIG. 2 depicts derivation of a 12-bit PON port identifier from a 32-bit IP multicast address.

FIG. 2 depicts derivation of a 12-bit PON port identifier from a 32-bit IP multicast address. The 4 MSB of the 32-bit IP multicast address are fixed, thus leaving the 28 LSB as being mappable. As depicted in FIG. 2, only the 11 LSB of the 12-bit PON port identifier are mapped because the 1 MSB of the 12-bit PON port identifier is set to a bit setting (i.e., a bit value) that designates the 12-bit PON port identifier as a multicast port identifier. A 12-bit PON port identifier provides for 4096 distinct port identifiers (i.e., $2^{12}$ distinct port identifiers), which are standard values for the port-ids or VPI. However, this number of distinctive port identifiers is far more than any hardware would reasonably support in real implementation.

In accordance with the present invention, the bit setting that designates the 12-bit PON port identifier as a multicast port identifier is a bit setting of 1. In contrast, for designating the 12-bit PON port identifier as a generic port identifier for applications non-related to the present invention, the 1 MSB of the 12-bit PON port identifier would be set to a bit setting that designates the 12-bit PON port identifier as a generic port identifier (i.e., a bit setting of 0). Because use of the 1 MSB of the 12-bit PON port identifier is fixed, each PON can only support up to 2048 distinct IP TV channels (i.e., $2^{11}$ distinct IP TV channels).

With only 11 LSB of the 12-bit PON port identifier being mappable, this means that only 11 bits of the 28 allocatable bits of the 32-bit IP multicast address can be mapped onto the PON port identifier. Accordingly, 17 bits of the 32-bit IP multicast address addressing capacity map to the same VP/port-ID (i.e., 131,072 ($2^{17}$) IP multicast addresses will map to the same VP/port-ID).

Figure 3:
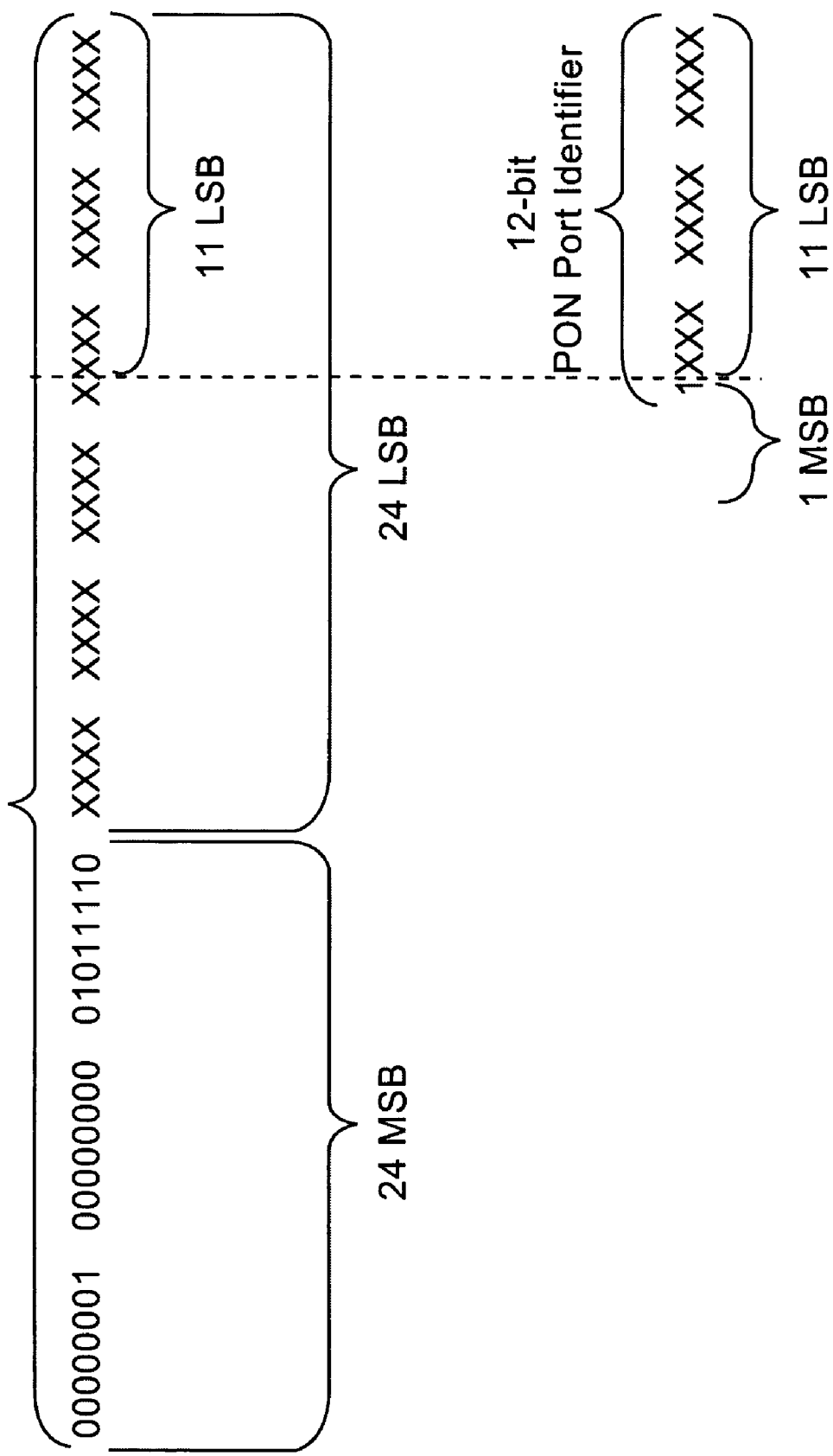
FIG. 3 depicts derivation of a 12-bit PON port identifier from a 48-bit MAC multicast address.

FIG. 3 depicts derivation of a 12-bit PON port identifier from a 48-bit MAC multicast address. The 24 MSB of the 48-bit MAC multicast address are fixed, thus leaving the 24 LSB as being mappable. As depicted in FIG. 3, only the 11 LSB of a 12-bit PON port identifier are mapped because the 1 MSB of the 12-bit PON port identifier is set to a bit setting (i.e., a bit value) that designates the 12-bit PON port identifier as a multicast port identifier. As mentioned above, a 12-bit PON port identifier provides for 4096 distinct port identifiers (i.e., $2^{12}$ distinct port identifiers), which are standard values for the port-ids or VPI. However, this number of distinctive port identifiers is far more than any hardware would reasonably support in real implementation.

In accordance with the present invention, the bit setting that designates the 12-bit PON port identifier as a multicast port identifier is a bit setting of 1. In contrast, for designating the 12-bit PON port identifier as a generic port identifier for applications non-related to the present invention, the 1 MSB of the 12-bit PON port identifier would be set to a bit setting that designates the 12-bit PON port identifier as a generic port identifier (i.e., a bit setting of 0). Because use of the 1 MSB of the 12-bit PON port identifier is fixed, each PON can only support up to 2048 distinct MAC TV channels (i.e., $2^{11}$ distinct MAC TV channels).

With only 11 LSB of the 12-bit PON port identifier are mappable, this means that only 11 bits of the 24 allocatable bits of the 48-bit MAC multicast address can be mapped onto the PON port identifier. Accordingly, 13 bits of the 48-bit MAC multicast address addressing capacity map to the same VP/port-ID (i.e., 8192 ($2^{13}$) MAC multicast addresses will map to the same VP/port-ID).

Figure 4:
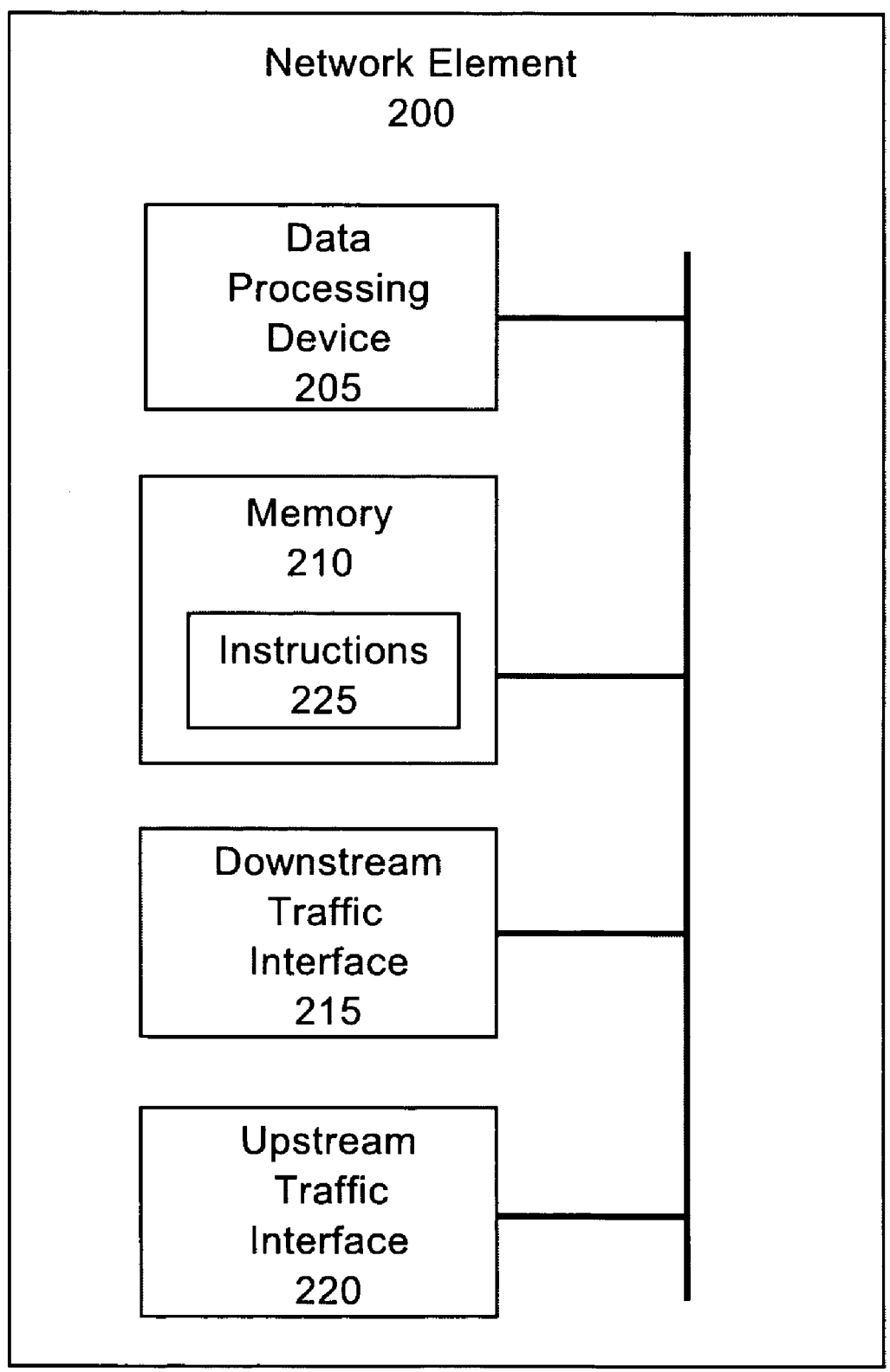
FIG. 4 depicts a network element in accordance with the present invention.

Referring now to FIG. 4, a network element in accordance with the present invention is depicted. The network element is referred to herein as the network element 200. The network element 200 includes a data processing device 205 (i.e., at least one data processing device), memory 210, a downstream traffic interface 215 and an upstream traffic interface 220. The data processing device 205, the memory 210, the downstream traffic interface 215 and the upstream traffic interface 220 are connected for enabling interaction therebetween. The processor is configured for carrying out-processing requirements for a host of different functionalities performed by the network element 200. One of these functionalities is PON port identifier derivation functionality in accordance with the present invention.

In the case of the network element 200 being an ONTU, the downstream traffic interface 215 enables the transmission of traffic to subscriber equipment and the upstream traffic interface enables the transmission of traffic to an OLT (e.g., via an ONTU). In the case of the network element 200 being an OLT, the downstream traffic interface 215 enables the transmission of traffic to an ONTU and the upstream traffic interface enables transmission of traffic to a central office or head-end.

Residing on the memory 210 is instruction 225 for, among other functionality, carrying out PON port identifier derivation functionality in accordance with the present invention. The instructions 225 are accessible from the memory and are processable by the data processing device 205. The instructions 225 are configured for enabling the data processing device to facilitate identifying a M-bit multicast address (e.g., a 32-bit IP multicast address or a 48-bit MAC multicasting address) and deriving a N-bit PON port identifier (e.g., a 12-bit PON port identifier) from the M-bit multicast address, such as was described above in reference to FIGS. 1-3. The N-bit PON port identifier has fewer bits than the M-bit multicast address. Deriving the N-bit PON port identifier includes mapping N−1 LSB of the M-bit multicast address to N−1 LSB of the N-bit PON port identifier and setting a 1 MSB of the N-bit PON port identifier to a setting that designates the N-bit PON port identifier as being a multicast port identifier.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method using a network element comprising:
identifying a M-bit multicast address; and
deriving a N-bit PON (Passive Optic Network) port identifier from the M-bit multicast address, wherein the N-bit PON port identifier has fewer bits than the M-bit multicast address and wherein said deriving the N-bit PON port identifier includes mapping N−1 Least Significant Bits (LSB) of the M-bit multicast address to N−1 LSB of the N-bit PON port identifier and setting a 1 Most Significant Bit (MSB) of the N-bit PON port identifier to a bit setting that designates the N-bit PON port identifier as being a multicast port identifier.

2. The method of claim 1 wherein the M-bit multicast address is an Internet Protocol (IP) multicast address.

3. The method of claim 1 wherein the M-bit multicast address is a Media Access Control (MAC) multicast address.

4. The method of claim 1 wherein the bit setting is a bit setting of 1.

5. The method of claim 1 wherein said identifying and said deriving are performed at both an Optical Line Terminal (OLT) and an Optical Network Termination Unit (ONTU) of a Passive Optical Network (PON).

6. The method of claim 1 wherein said deriving the N-bit PON port identifier is performed automatically by the network element without human intervention in response to said identifying the M-bit multicast address.

7. The method of claim 1 wherein:
the M-bit multicast address is at least one of an IP multicast address and a MAC multicast address;
the bit setting is a bit setting of 1;
said identifying and said deriving are performed at both an OLT and an ONTU of a PON; and
said deriving the N-bit PON port identifier is performed automatically without human intervention in response to said identifying the M-bit multicast address.

8. A method using a network element, comprising:
identifying one of a 32-bit Internet Protocol (IP) multicast address and a 48-bit Media Access Control (MAC) multicast address; and
deriving a 12-bit PON port identifier from said one of the 32-bit IP multicast address and the 48-bit MAC multicast address, wherein said deriving the 12-bit PON port identifier includes mapping 11 Least Significant Bits (LSB) of said one of the 32-bit IP multicast address and the 48-bit MAC multicast address to 11 LSB of the 12-bit PON port identifier and setting a 1 Most Significant Bit (MSB) of the 12-bit PON port identifier to a bit setting that designates the 12-bit PON port identifier as being a multicast port identifier.

9. The method of claim 8 wherein the bit setting is a bit setting of 1.

10. The method of claim 8 wherein:
said deriving the 12-bit PON port identifier is performed automatically without human intervention in response to said identifying said multicast address; and
said identifying and said deriving are performed at both an Optical Line Terminal (OLT) and an Optical Network Termination Unit (ONTU) of a Passive Optical Network (PON).

11. The method of claim 8 wherein:
the bit setting is a bit setting of 1;
said deriving the 12-bit PON port identifier is performed automatically without human intervention in response to said identifying said multicast address:
said identifying and said deriving are performed at both an OLT and an ONTU of a PON.

12. A network element, comprising:
at least one data processing device;
memory connected to said at least one data processing device; and
instructions accessible from said memory and processable by said at least one data processing device, wherein said instructions are configured for enabling said at least one data processing device to facilitate:
identifying a M-bit multicast address; and
deriving a N-bit PON port identifier from the M-bit multicast address, wherein the N-bit PON port identifier has fewer bits than the M-bit multicast address and wherein said deriving the N-bit PON port identifier includes mapping N−1 Least Significant Bits (LSB) of the M-bit multicast address to N−1 LSB of the N-bit PON port identifier and setting a 1 Most Significant Bit (MSB) of the N-bit PON port identifier to a bit setting that designates the N-bit PON port identifier as being a multicast port identifier.

13. The network element of claim 12 wherein:
   the M-bit multicast address is a 32-bit Internet Protocol (IP) multicast address; and
   the N-bit PON port identifier is a 12-bit PON port identifier.

14. The network element of claim 13 wherein the bit setting is a bit setting of 1.

15. The network element of claim 12 wherein:
   the M-bit multicast address is a 48-bit Media Access Control (MAC) multicast address; and
   the N-bit PON port identifier is a 12-bit PON port identifier.

16. The network element of claim 15 wherein the bit setting is a bit setting of 1.

17. The network element of claim 12 wherein the bit setting is a bit setting of 1.

18. The network element of claim 12 wherein said identifying and said deriving are performed at both an Optical Line Terminal (OLT) and an Optical Network Termination Unit (ONTU) of a Passive Optical Network (PON).

19. The network element of claim 12 wherein said deriving the N-bit PON port identifier is performed automatically by the network element without human intervention in response to said identifying the M-bit multicast address.

20. The network element of claim 12 wherein:
   the M-bit multicast address is one of a 32-bit IP multicast address and 48-bit MAC multicast address;
   the N-bit PON port identifier is a 12-bit PON port identifier;
   the bit setting is a bit setting of 1;
   said identifying and said deriving are performed at both an OLT and an ONTU of a PON; and
   said deriving the N-bit PON port identifier is performed automatically without human intervention in response to said identifying the M-bit multicast address.

* * * * *

UNITED STATES PATENT AND TRADEMARK OFFICE
CERTIFICATE OF CORRECTION

PATENT NO.      : 7,636,354 B2                                             Page 1 of 1
APPLICATION NO. : 11/231186
DATED           : December 22, 2009
INVENTOR(S)     : Leopold Diouf It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 990 days.

Signed and Sealed this

Twenty-first Day of December, 2010

David J. Kappos
*Director of the United States Patent and Trademark Office*